No. 745,893. PATENTED DEC. 1, 1903.
H. PACE.
WHEEL FOR VEHICLES.
APPLICATION FILED MAR. 26, 1902.
NO MODEL.
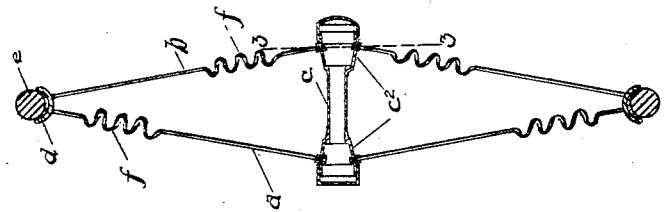
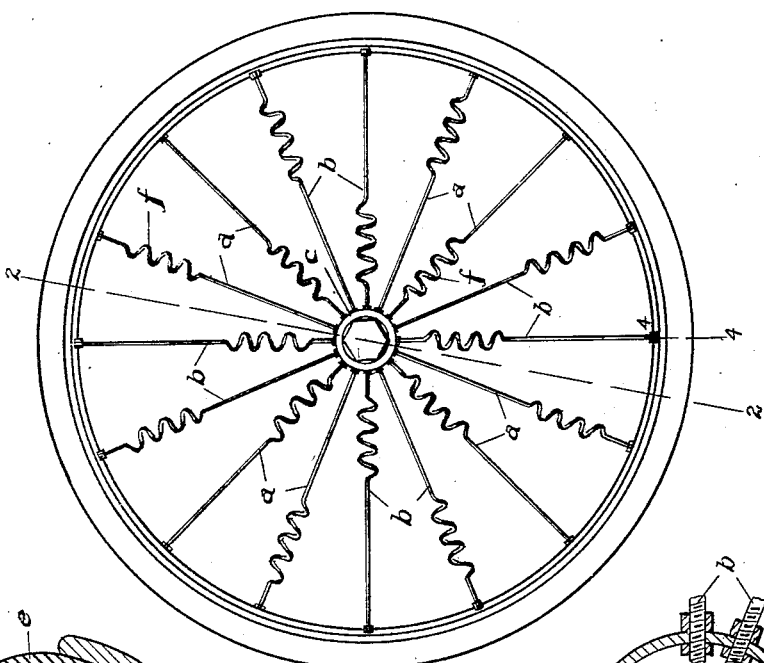
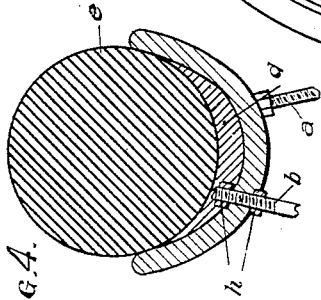
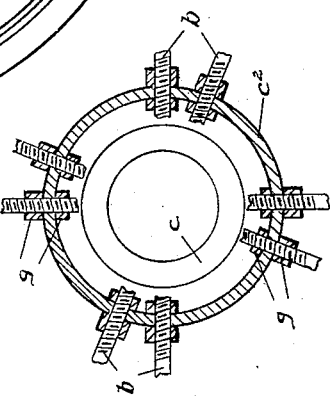
WITNESSES
F. A. Stewart
J. E. Larsen
INVENTOR
Harry Pace
BY
Edgar Tate & Co
ATTORNEYS No. 745,893. Patented December 1, 1903.

UNITED STATES PATENT OFFICE.

HARRY PACE, OF LONDON, ENGLAND.

WHEEL FOR VEHICLES.

SPECIFICATION forming part of Letters Patent No. 745,893, dated December 1, 1903.

Application filed March 26, 1902. Serial No. 99,993. (No model.)

*To all whom it may concern:*

Be it known that I, HARRY PACE, a subject of the King of Great Britain, residing at Hampstead, London, N. W., England, have invented certain new and useful Improvements in Wheels for Vehicles, of which the following is a full and complete specification, such as will enable those skilled in the art to which it appertains to make and use the same.

This invention relates to wheels for light vehicles; and the object thereof is to so construct such wheels as to give thereto all the spring qualities of a pneumatic tire and at the same time make the wheel strong and durable. I accomplish this object by means of the construction described in the following specification, of which the accompanying drawings form a part, in which the separate parts of my improvement are designated by suitable reference characters in each of the views, and in which—

Figure 1 is a side view of a wheel made according to my invention; Fig. 2, a section thereof on the line 2 2; Fig. 3, a transverse section on the line 3 3 of Fig. 2; and Fig. 4, a transverse section through the tire, rim of the wheel, and showing the method of connecting the spokes therewith.

In the drawings forming part of this specification I have shown at $a$ and $b$ the spokes of my improved wheel and at $c$ the central hub, through which the axle or spindle passes, the said axle or spindle being not shown, and said central hub or casing $c$ is enlarged at each end and shown at $c^2$. I have also shown at $d$ the rim of the wheel and at $e$ a solid tire composed of rubber or any suitable material, and I prefer to connect the spokes $a$ and $b$ with the central hub or casing $c$ and the rim $d$ in the manner shown, in which the said spokes are divided into pairs at each side of the wheel.

The spokes are each provided with a spiral section or portion $f$ and are composed of steel wires or rods, and preferably about one-third of each is formed into a spiral. This construction of spokes gives to the wheel a spring action or quality similar to that of a pneumatic tire and it will be apparent that a wheel made in this manner may be used on almost any light vehicle.

In connecting the spokes with the hub or casing $c$ the spokes are screw-threaded and provided with two nuts $g$, one on the inner side and the other on the outer side, and in connecting the said spokes with the rim $d$ a similar construction is employed, the spokes being provided at this point with two nuts $h$, one on the inner side and one on the outer side of said rim, and this construction enables the spokes to withstand the pull and thrust to which they are subjected in the operation of the wheel.

My invention is not limited to the shape or construction of the central hub or casing $c$, nor to the form of the rim $d$, nor to the method of connecting the tire with said rim, and changes in and modifications of the construction herein described made by me without departing from the spirit of my invention or sacrificing its advantages.

Having fully described my invention, what I claim as new, and desire to secure by Letters Patent, is—

A wheel the spokes of which are adjustably connected both with the hub and rim, said spokes being arranged in pairs and the inner ends of the spokes of one pair being connected, one with one end of the hub and the other with the other end of the hub, the spokes of each pair being also formed into spring-coils, the coil in one spoke of each pair being adjacent to the rim and the coil in the other spoke of each pair being adjacent to the hub, substantially as shown and described.

In testimony that I claim the foregoing as my invention I have signed my name, in presence of the subscribing witnesses, this 11th day of March, 1902.

HARRY PACE.

Witnesses:
H. D. JAMESON,
A. NUTTING.